United States Patent
Hewitt et al.

(10) Patent No.: US 11,555,520 B2
(45) Date of Patent: Jan. 17, 2023

(54) COVER ASSEMBLY FOR BEARING

(71) Applicant: Dodge Industrial, Inc., Oxford, CT (US)

(72) Inventors: William G. Hewitt, Taylors, SC (US); Thomas E. Kuckhoff, Greenville, SC (US); Marshall C. Corbett, Belton, SC (US)

(73) Assignee: Dodge Industrial, Inc., Oxford, CT (US)

( * ) Notice: Subject to any disclaimer, the term of this patent is extended or adjusted under 35 U.S.C. 154(b) by 0 days.

(21) Appl. No.: 17/326,690

(22) Filed: May 21, 2021

(65) Prior Publication Data

US 2022/0373032 A1    Nov. 24, 2022

(51) Int. Cl.
*F16C 35/04* (2006.01)
*F16C 33/72* (2006.01)

(52) U.S. Cl.
CPC .......... *F16C 35/047* (2013.01); *F16C 33/723* (2013.01)

(58) Field of Classification Search
CPC .... F16C 33/723; F16C 33/7886; F16C 35/00; F16C 35/04; F16C 35/045; F16C 35/047; F16C 35/12
See application file for complete search history.

(56) References Cited

U.S. PATENT DOCUMENTS

| | | | | |
|---|---|---|---|---|
| 3,734,579 A | * | 5/1973 | Schumacher | F16C 33/723 301/108.3 |
| 5,328,276 A | * | 7/1994 | Linteau | F16C 33/76 384/477 |
| 5,711,617 A | * | 1/1998 | Scheller | F16C 23/084 384/903 |
| 6,283,635 B1 | | 9/2001 | Downey et al. | |
| 6,428,213 B1 | * | 8/2002 | Parejko | F16C 33/723 384/489 |
| 8,888,372 B2 | * | 11/2014 | Ciulla | F16C 41/007 384/546 |
| 10,247,244 B2 | * | 4/2019 | Ress | F16C 23/084 |
| 11,306,782 B2 | * | 4/2022 | Saxon | F16C 35/042 |
| 2008/0069489 A1 | | 3/2008 | Drake et al. | |

FOREIGN PATENT DOCUMENTS

WO    WO81/00140    *  1/1981

\* cited by examiner

*Primary Examiner* — James Pilkington
(74) *Attorney, Agent, or Firm* — Robinson & Cole LLP

(57) ABSTRACT

A bearing cover assembly configured to assemble to a bearing housing in which a rolling element bearing is accommodated. The bearing housing assembly includes an end cap with a sleeve portion that mates to an interior conical surface of the bearing housing with a complementary outer bevel formed on the sleeve portion.

20 Claims, 13 Drawing Sheets

COVER ASSEMBLY FOR BEARING

BACKGROUND

Rolling element bearings and babbitt bearings are anti-friction devices used to rotatably support shafts in industrial settings and mechanical equipment. Rolling element bearings include a plurality of rolling elements such as spherical balls or cylindrical rollers that are located between inner and outer bearing rings, commonly referred to as races, and the rolling elements are arranged so that they can roll along the inner and outer circumferences of the respective inner and outer bearing races. The rolling elements enable the inner and outer bearing races to rotate with respect to each other. A rotating shaft that is mounted to the inner bearing race can thus rotate with respect to the outer bearing race that may be fixedly mounted to a stationary supporting structure.

The rolling element bearings and races are typically supported in a bearing housing such as, for example, a pillow block housing or a flange housing that mounts the bearing to the supporting structure. The bearing housing includes a housing bore disposed through the structure in which the rolling element bearing is located. The shaft can extend into the housing bore from either or both sides of the housing structure. In some embodiments, the axial end of the shaft may be located in the bearing housing such that the shaft is anchored by the rolling element bearing mounted therein, while in other embodiments the shaft may extend through and beyond the bearing housing. The bearing housing may be made of cast iron or a similar structural material to rigidly support the bearing and transfer loads from the shaft to the supporting structure.

In order to maximize the safe operation of equipment, it has become a requirement that shafts and the bearing assemblies that permit rotation of the shafts are covered. To cover the housing bore, for example, to prevent unintended contact with the rotating shaft positioned therein, and to further prevent contamination and debris from entering and interfering with the operation of the bearing, bearing covers may be attached to the bearing housing. Common attachment mechanisms include using bolts or setscrews to fasten the bearing cover to the housing or press-fitting a polymer or steel cap into the housing bore to prevent the cover from being unintentionally dislodged due to incidental contact. Such attachments methods, however, may require that machining processes be undertaken after the bearing assembly is installed which is costly and can create other problems such as damage to the cover and/or the bearing. These attachment methods may further require compatibility between the style and/or dimension of the bearing housing and the corresponding bearing cover. Bearing housings are cast with a draft angle that facilitates removal of the part from a die. The draft angle creates non-parallel faces of the exterior of the housing, which poses a challenge to reliable attachment of a protective cover to the housing. Such modifications, for various reasons, can compromise the operation or performance of the bearings and/or shafts and can be costly to perform. The present disclosure is directed to an improved bearing cover assembly to facilitate attachment to a bearing housing and provide protection from incidental contact.

BRIEF SUMMARY

The disclosure describes a bearing cover assembly for enclosing the housing bore of a bearing housing accommodating a rolling element bearing that may be used to support a rotating shaft. The bearing cover assembly includes an end cap including a sidewall, an open end, an annular sleeve portion extending from the open end, the sleeve portion including an outer bevel formed about a circumference of the sleeve portion, and a pair of tabs formed on the sidewall. The bearing cover assembly includes first and second brackets, each of the first and second brackets including a shaft portion and a curved portion. When the bearing cover assembly is in an assembled state, the shaft portion of the first bracket is attached to a first of the pair of tabs with a first fastener and a free end of the curved portion of the first bracket is attached to a second fastener, and the shaft portion of the second bracket is attached to a second of the pair of tabs by the second fastener.

The disclosure further describes a bearing housing and bearing cover assembly including a bearing housing with a rolling element bearing installed in a housing bore, the housing bore defining an axis line, wherein an interior conical surface is formed in the bearing housing at the housing bore. A bearing cover assembly is attached to the bearing housing, the bearing cover assembly including an end cap, the end cap including a sidewall, an open end, an annular sleeve portion formed at the open end, the sleeve portion including an outer bevel formed about a circumference of the sleeve portion, a pair of tabs formed on the sidewall, and a bracket portion configured to secure the end cap to the bearing housing via the pair of tabs such that the outer bevel of the end cap engages the interior conical surface of the bearing housing to position the end cap on the bearing housing.

A possible advantage of the disclosure is that the bearing cover assembly is securely and positively engaged to the bearing housing so as to prevent unintentional dislodgement of the bearing cover assembly. These and other possible advantages and features will be apparent from the following detailed description and accompanying drawings.

DETAILED DESCRIPTION

Figure 15:
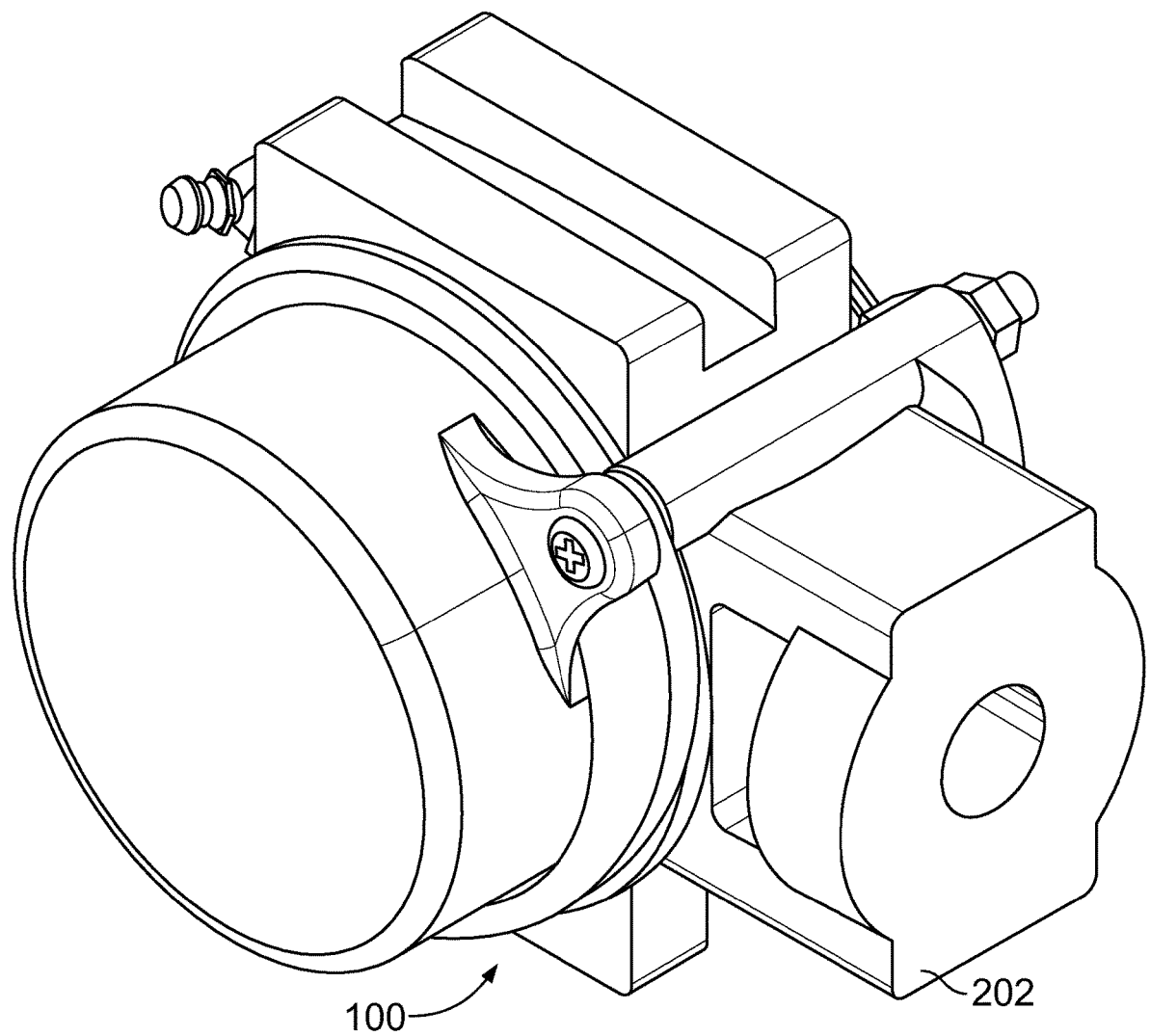
FIG. 15 is a perspective assembly view of the bearing cover assembly of FIG. 2 attached to a gearbox housing.

Now referring generally to FIGS. 1-8 where, whenever possible, like reference numbers will refer to like elements, there is illustrated a bearing cover assembly 100 configured for attachment to a bearing housing 102. The bearing housing 102 defines a circular housing bore 104 in which a rolling element bearing 106 can be accommodated. The housing bore 104 and rolling element bearing 106 define an axis line 108. In addition to being used on a bearing housing, in various applications the cover assembly 100 can be used on an enclosed gear box 202 (FIG. 15) or other mechanisms. When a rotating shaft is supported in the bearing housing 102, it can align with and rotate with respect to the axis line 108. The bearing housing 102 may be configured as a pillow block as illustrated that can mount to a supporting structure that supports the loads transmitted from the shaft. The bearing housing 102 can be made of cast iron or a similar rigid material of suitable strength and may include lubrication ports or grease fasteners as is known to receive lubrication for the rolling element bearing 106. In accordance with the disclosure, however, the bearing housing 106 may have other configurations and be made of other materials.

To enclose the exposed aperture of the housing bore 104 on one side of the bearing housing 102, the bearing cover assembly 100 has a cap and bracket construction configured to be assembled to and engage the housing. The bearing cover assembly 100 can include first and second brackets 110, 112 that are positioned on or adjacent first and second faces 114, 116 of the bearing housing 102 and an end cap 118 that is connected to the first and second annular brackets by fasteners 120, 122 in a manner that holds the assembled bearing cover assembly to positively engage with the housing bore 104 at the first face. Fastener 120 includes a nut 120a and a bolt 120b, and similarly, fastener 122 includes a nut 122a and a bolt 122b. Other types of fasteners are contemplated such as threaded pins provided with threads on both ends for receiving suitable nuts, or solid pins with internal threads for receiving screws, for example.

The brackets 110, 112 and the end cap 118 can be made from a molded plastic material, a composite, or a metal-based material, such as steel, or any suitable material that secures the bearing cover assembly to the bearing housing and is resistant to impacts and tolerant of the operating environment. Alternatively, the brackets 110, 112 and end cap 118 may be made of different suitable materials. The brackets 110, 112 may be separate components or formed as a one-piece construction with a first bracket portion 110 and a second bracket portion. In one embodiment, the bearing cover assembly 100 includes an end cap 118 as detailed herein and a bracket 113 formed as a multi-piece or one-piece construction that is sized and shaped to secure the end cap to the housing 102.

Figure 1:
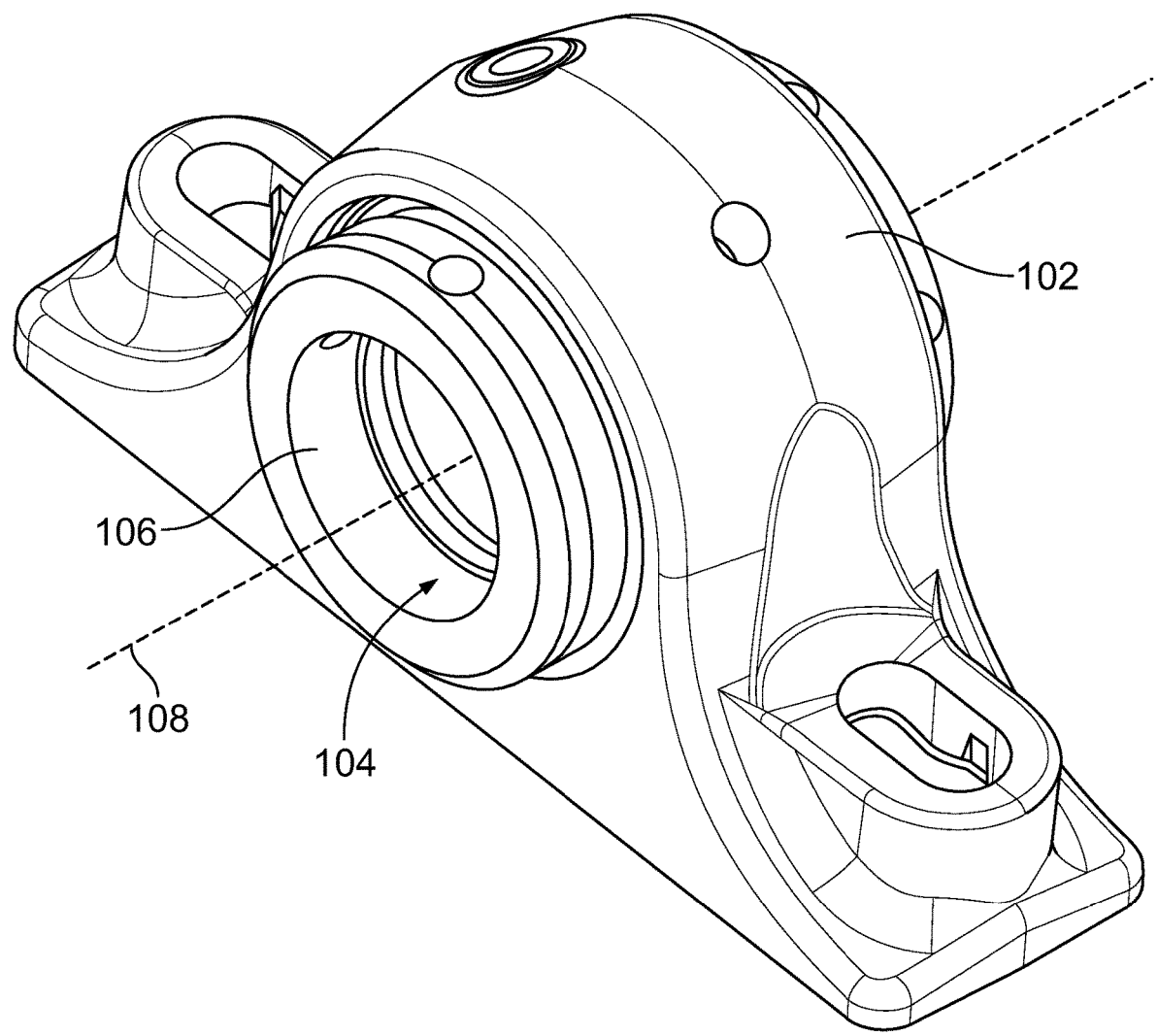
FIG. 1 is a perspective view of a bearing housing and bearing.
Figure 2:
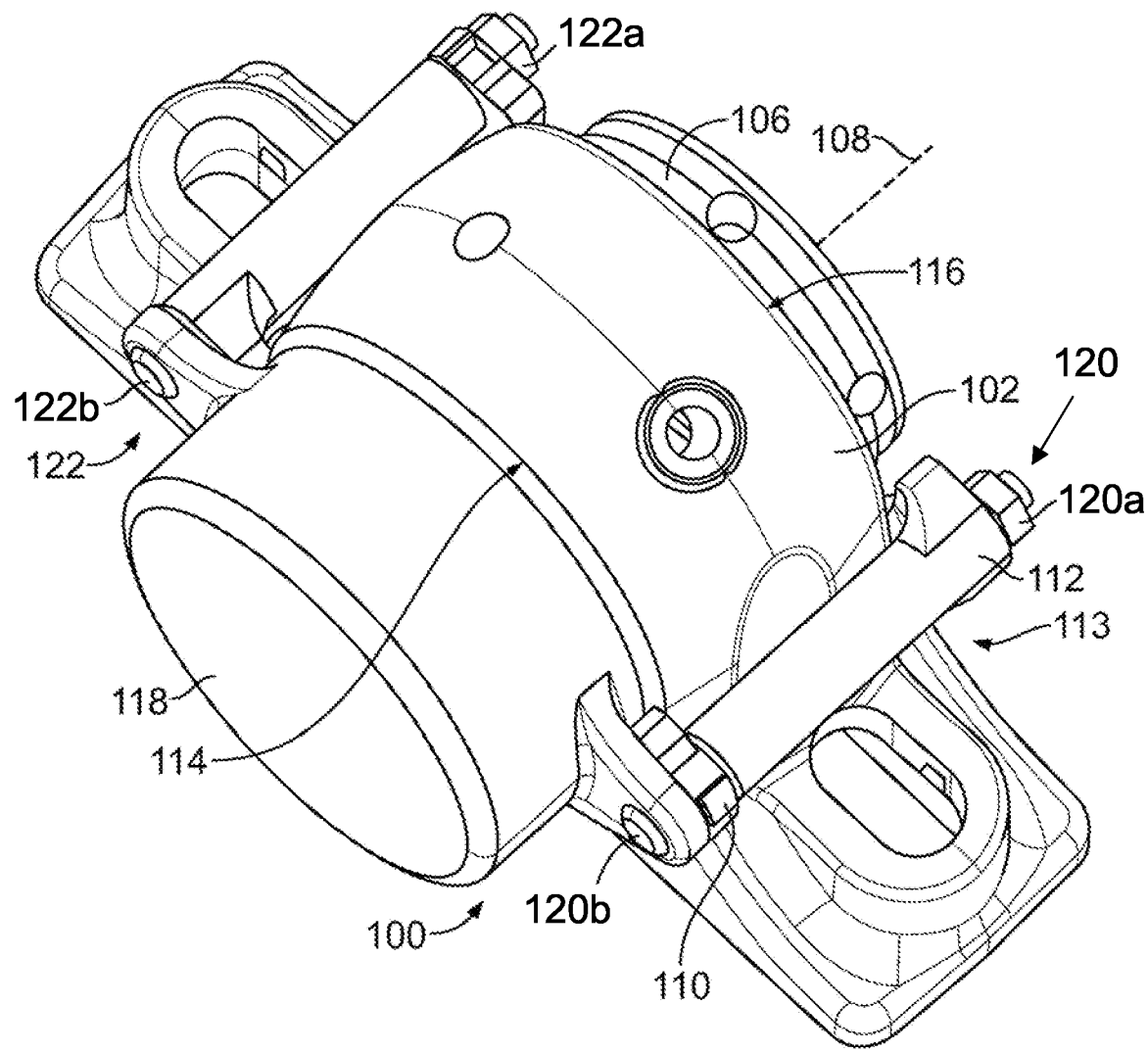
FIG. 2 is a perspective assembly view of a bearing cover assembly installed onto the bearing housing.
Figure 3:
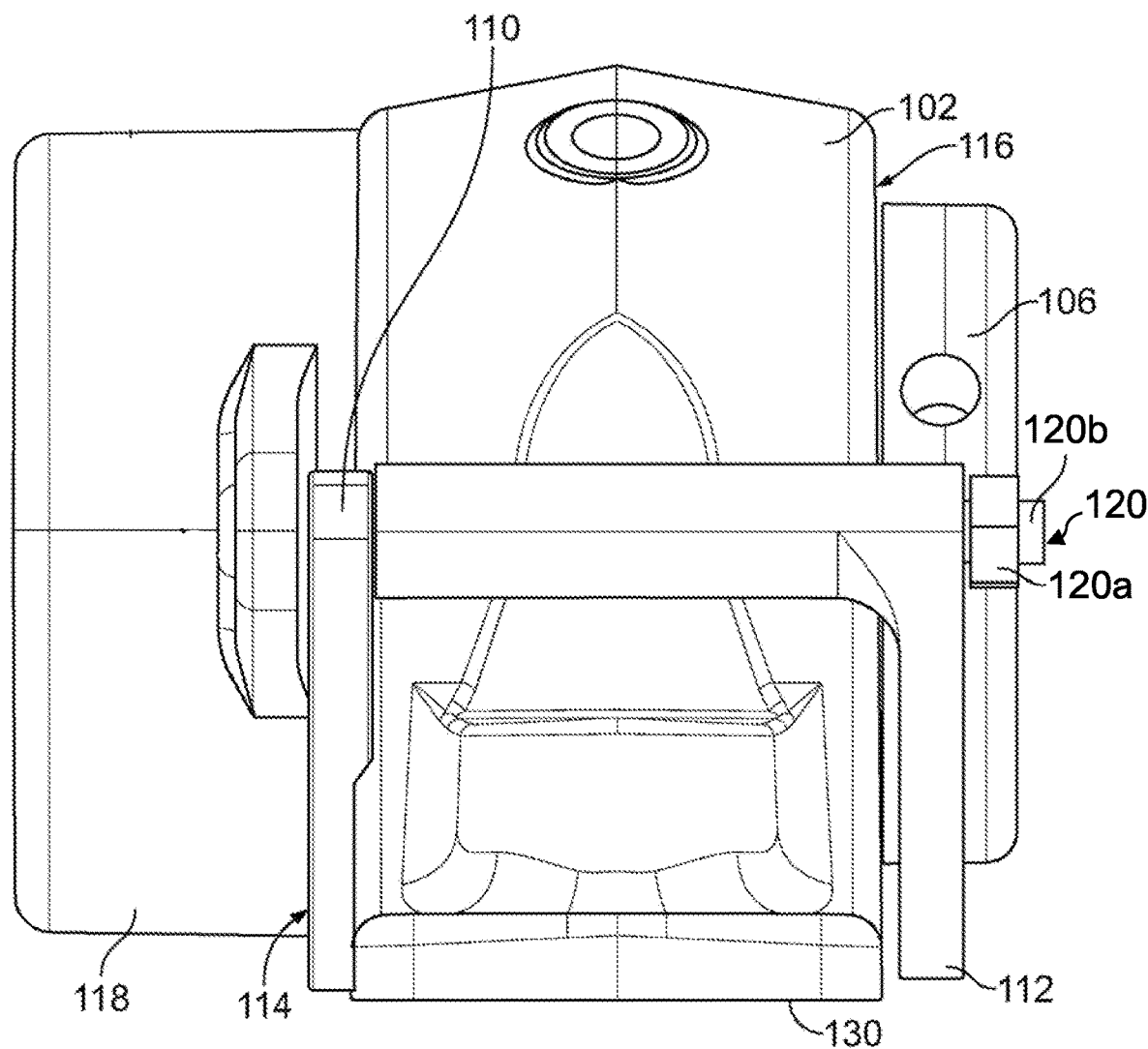
FIG. 3 is a side view of the bearing cover assembly of FIG. 2.
Figure 4:
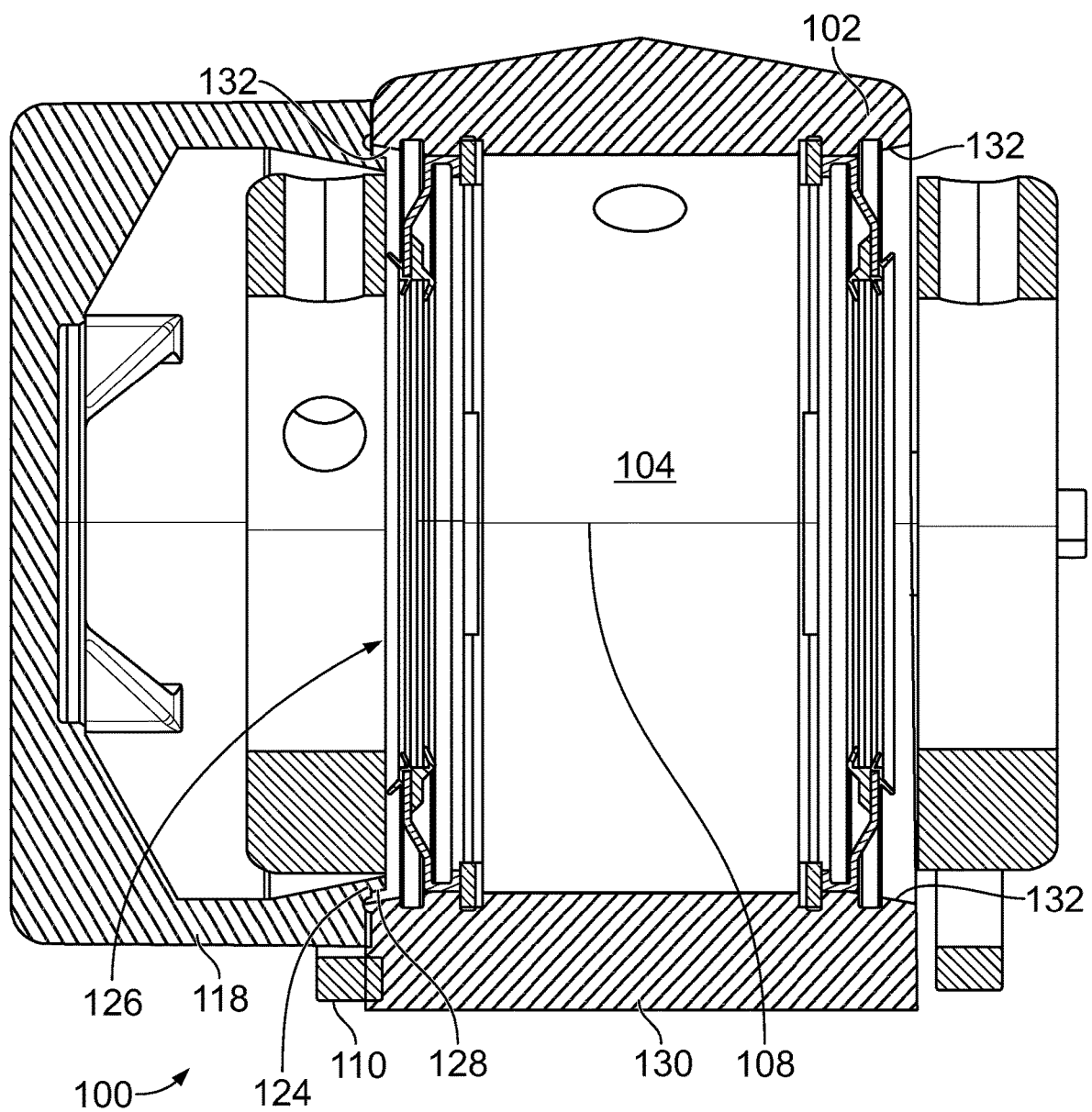
FIG. 4 is a cross-sectional view of the bearing cover assembly attached to the bearing housing.
Figure 5:
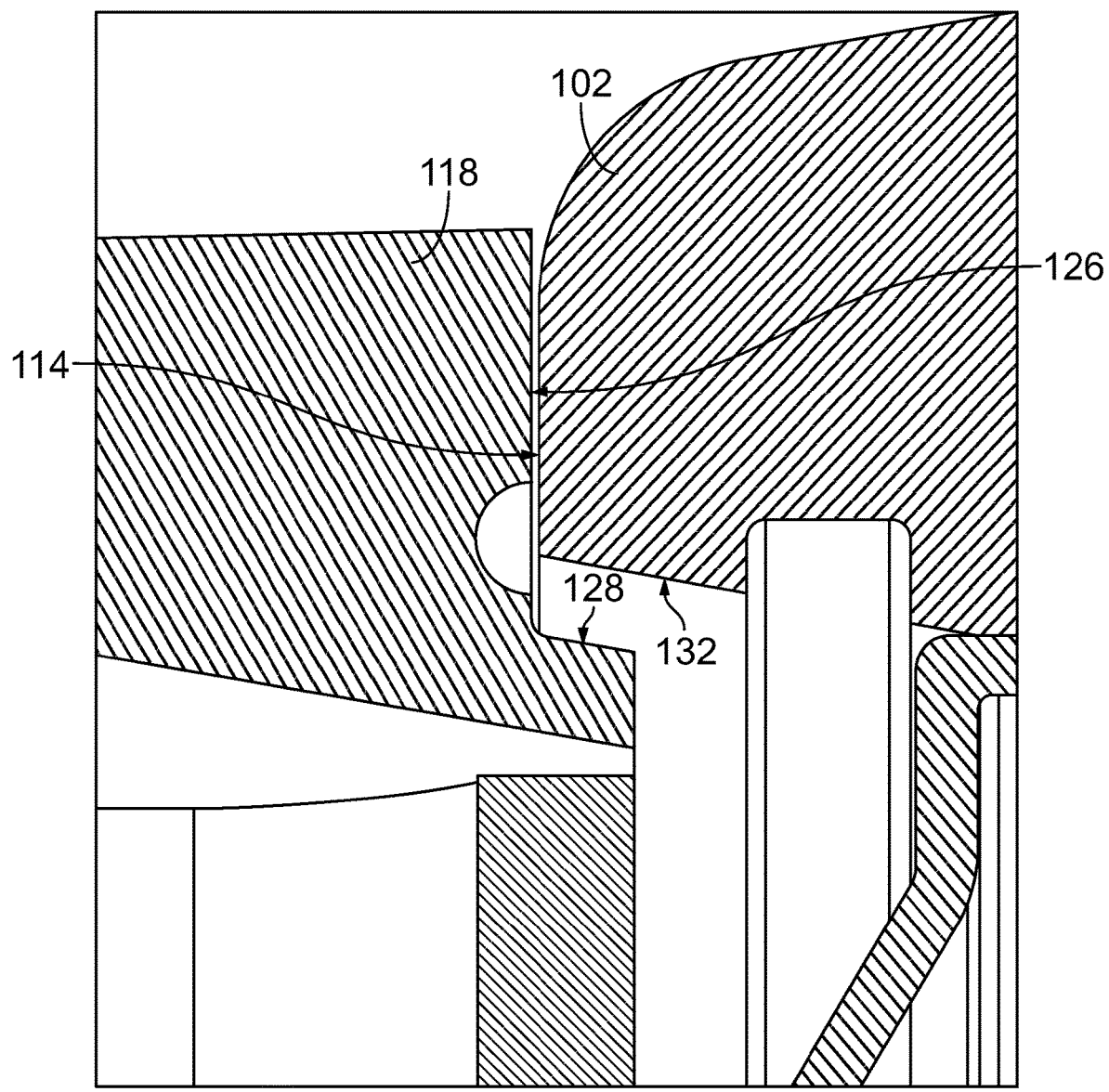
FIG. 5 is a close-up view of the bearing cover assembly attached to the bearing housing illustrating the self-centering configuration of the bearing cover assembly in relation to the bearing housing.
Figure 6:
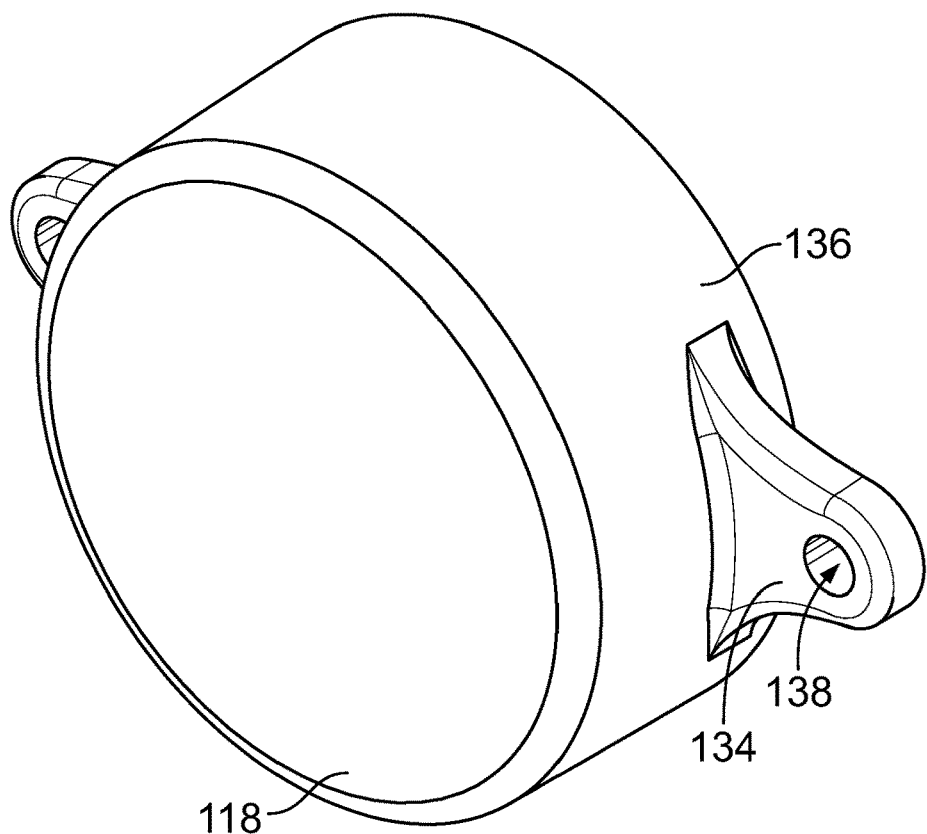
FIG. 6 is a perspective view of an embodiment of an end cap of the bearing cover assembly.

Turning to FIGS. 4 and 6, the cap 118 has a generally concave or basket shape that is sized to be received on the face of the housing 102 and, as will be discussed hereinbelow, configured to center itself axially on the circular housing bore 104 with a complementary shape adjacent to or on, but not necessarily in full contact with, the face 114 of the housing bore. The cap 118 includes a pair of tabs 134 that extend radially outwardly, relative to the axis 108 (FIG. 1) from a sidewall 136 of the cap. The sidewall 136 may be cylindrical or any suitable shape. Each of the tabs 134 include a bore 138 formed therethrough generally parallel to the axis when the cap 118 is attached to the bearing housing 102. The tabs 134 may be positioned opposite each other on the cap 118.

Because the bearing housing 102 is designed with a specified draft angle for removal from a manufacturing fixture such as a die, planes defined by the faces 114, 116 are not parallel to each other. The draft angle creates a housing 102 that is wider at a base portion 130 and tapers in a direction away from the base. Accordingly, fixing the cap 118 to the face 114 could cause the bearing cover assembly 100 to be misaligned or racked, which would prevent the creation of a good seal against the housing 102, could damage the bearing cover assembly 100 or the housing, and could result in a less than acceptable secure connection of the bearing cover assembly on the housing 102 and allow incidental contact.

The end cap 118 mates with the housing 102 via a sleeve 124 formed on the cap that extends from the open end 126 of the cap. The sleeve has an outer bevel 128 that extends around the outer circumference of the sleeve. The outer bevel 128 is radially inclined toward the axis line 108 and circumferentially extends about the axis line when the cap 118 is on the housing 102. An interior annular conical surface 132 formed on the first face 114 of the bearing housing 102 and which opens to the housing bore 104 is matingly complementary in size and shape to the outer bevel 128 of the sleeve 124. The interior annular conical surface 132 is funnel-shaped in the direction of the interior of the housing 102. In one embodiment, the conical surface 132 and the outer bevel 128 are substantially parallel or fall within a substantially identical cone relative to the axis 108.

When the end cap 118 is brought axially toward and into a position adjacent the first face 114 of the bearing housing 102 the outer bevel 128 is brought into concentric engagement with the conical surface 132 of the housing and locates and centers the cap on the housing bore 104 of the bearing housing. The outer bevel 128 contacts the conical surface 132 and cooperatively forms a seal between the cap 118 and the bearing housing 102 even when the open end 126 of the cap is not perfectly parallel to the plane defined by the first face 114 because the fit of the cap to the housing is not dependent upon the fit of respective surfaces defined by the first face 114 of the housing and the open end 126 of the cap.

Figure 7:
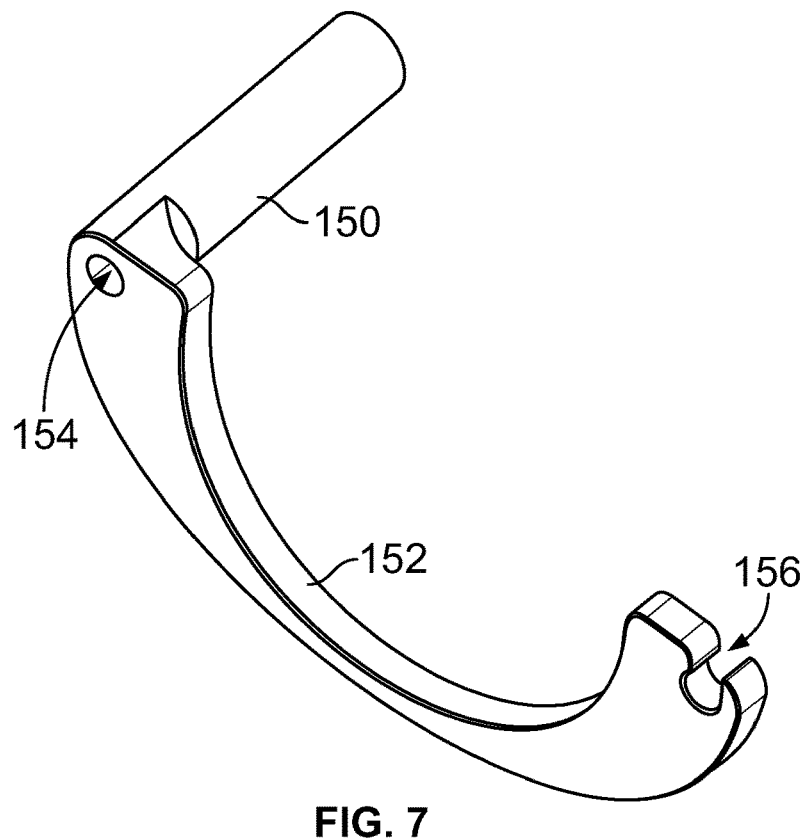
FIG. 7 is a perspective view of an embodiment of an annular adapter of the bearing cover assembly.
Figure 8:
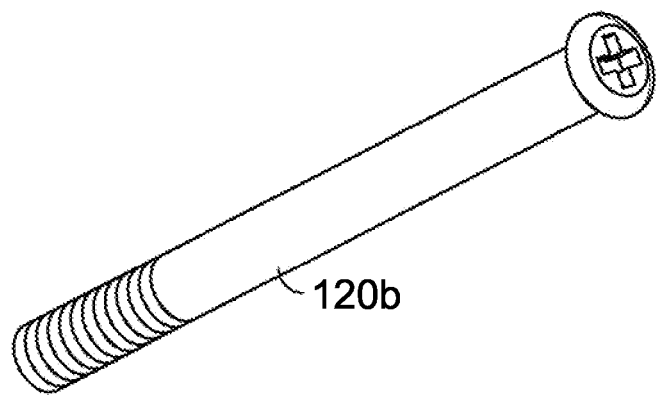
FIG. 8 is a perspective view of a fastener of the bearing cover assembly.
Figure 9:
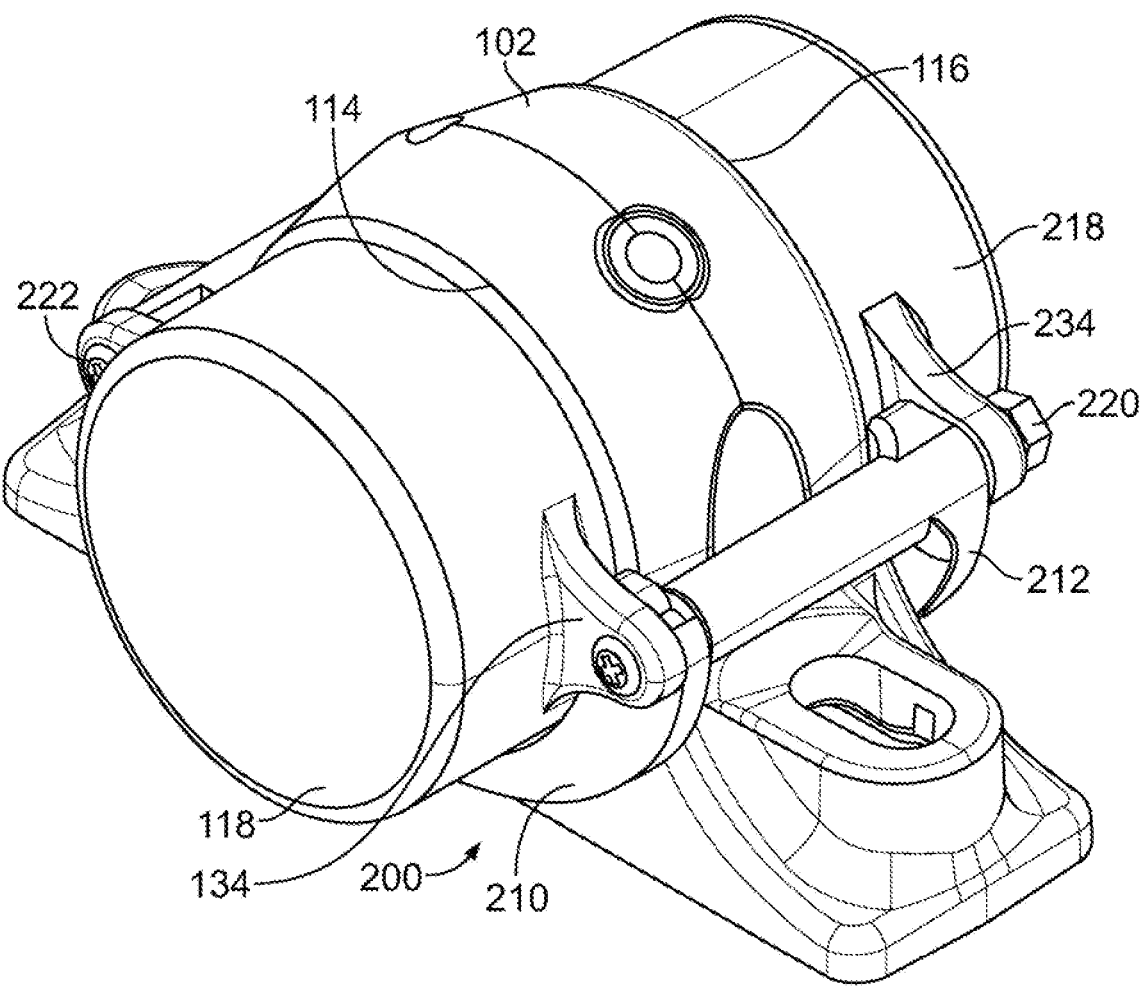
FIG. 9 is a first perspective assembly view of an embodiment of a bearing cover assembly installed onto the bearing housing.
Figure 10:
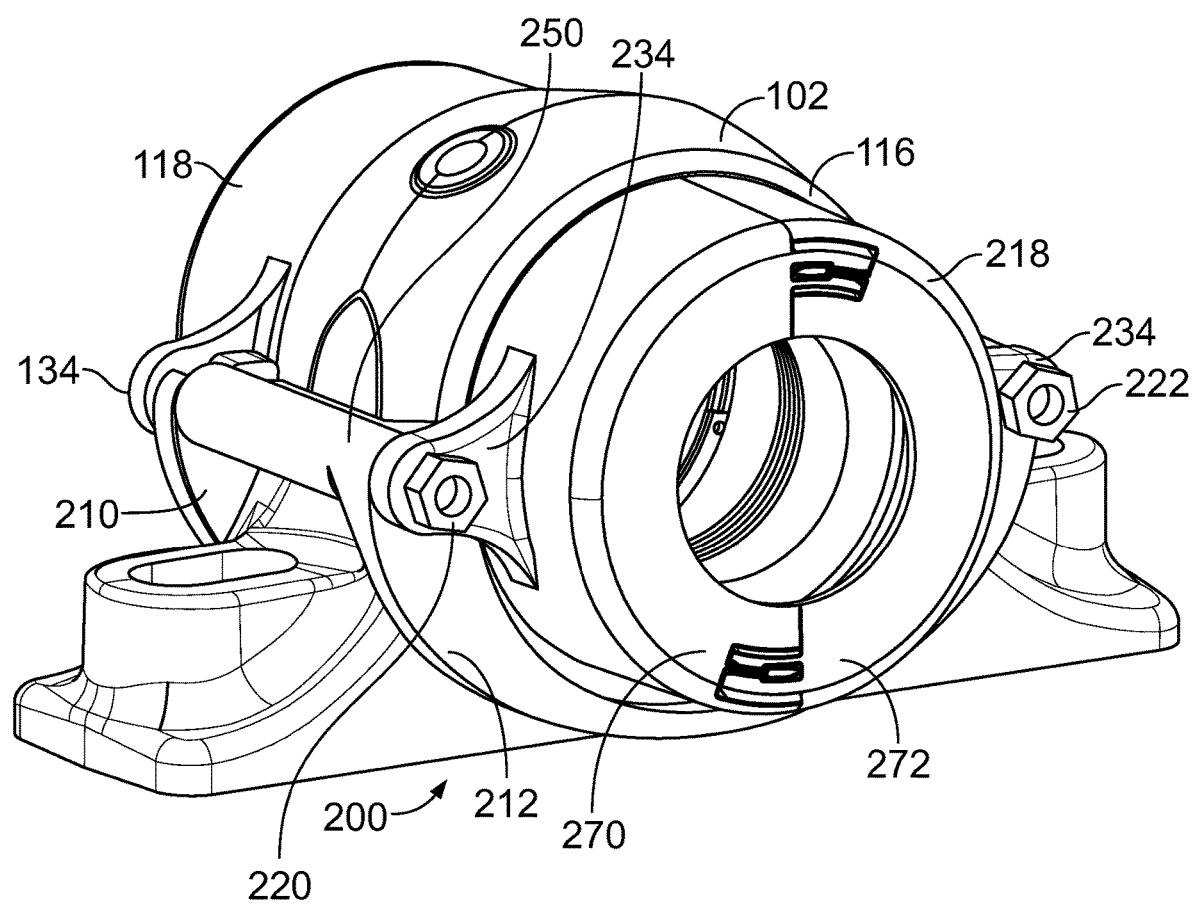
FIG. 10 is a second perspective assembly view of the bearing cover assembly of FIG. 9 installed onto the bearing housing illustrating an end cap that may be constructed from two complementary parts.
Figure 11:
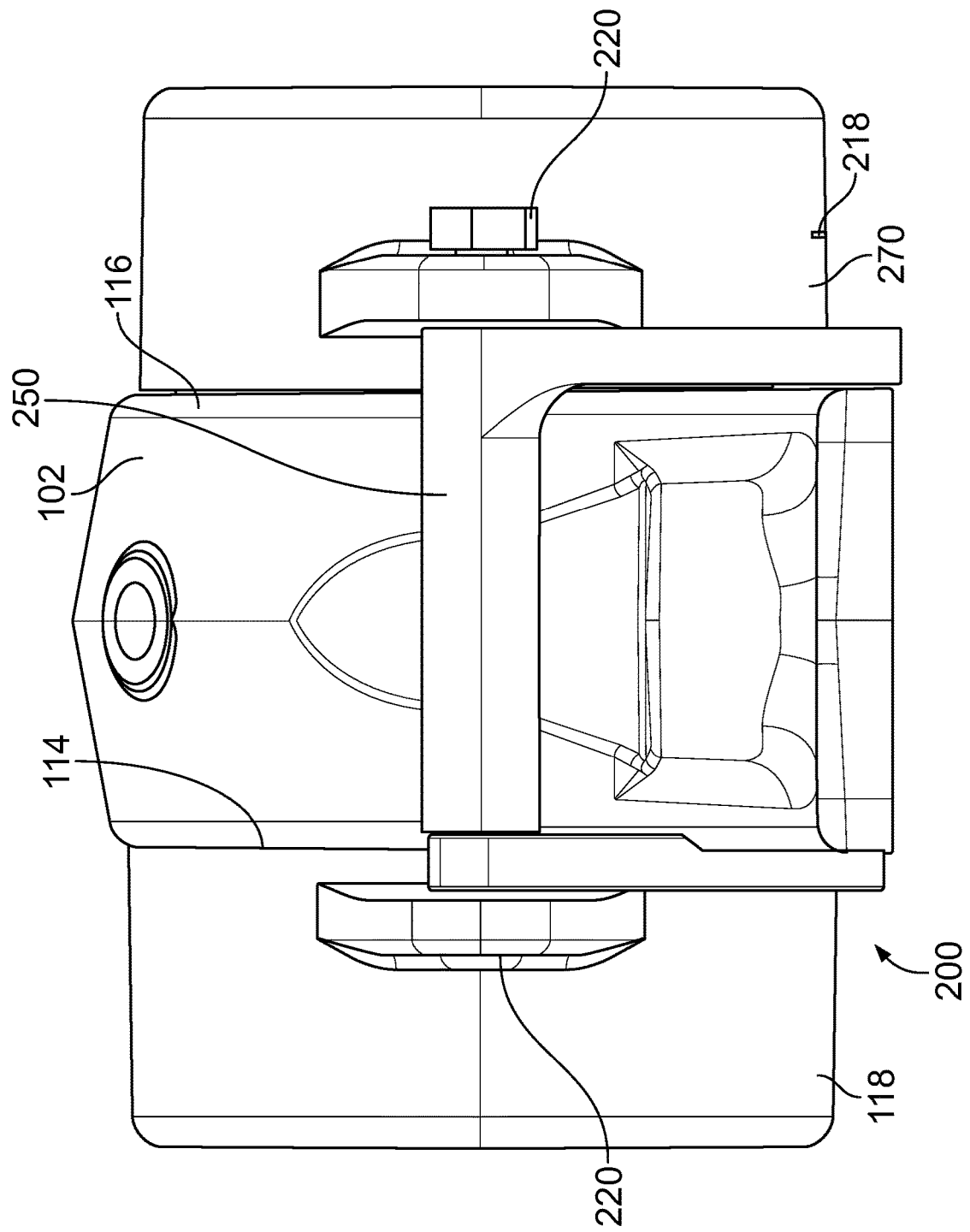
FIG. 11 is a side view of the bearing cover assembly of FIGS. 9 and 10.
Figure 12:
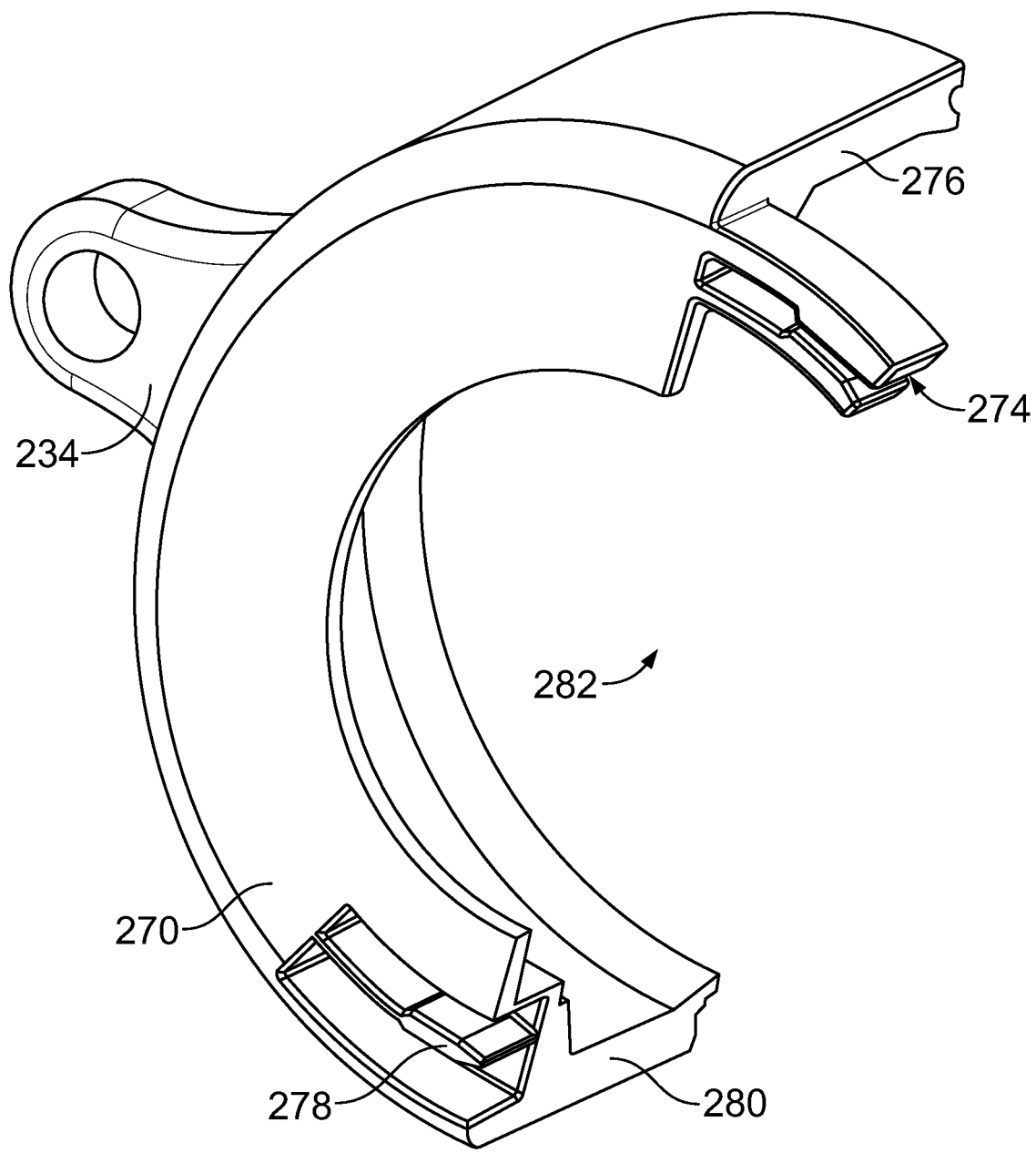
FIG. 12 is a perspective view of an end cap part of the end cap of FIG. 10.
Figure 13:
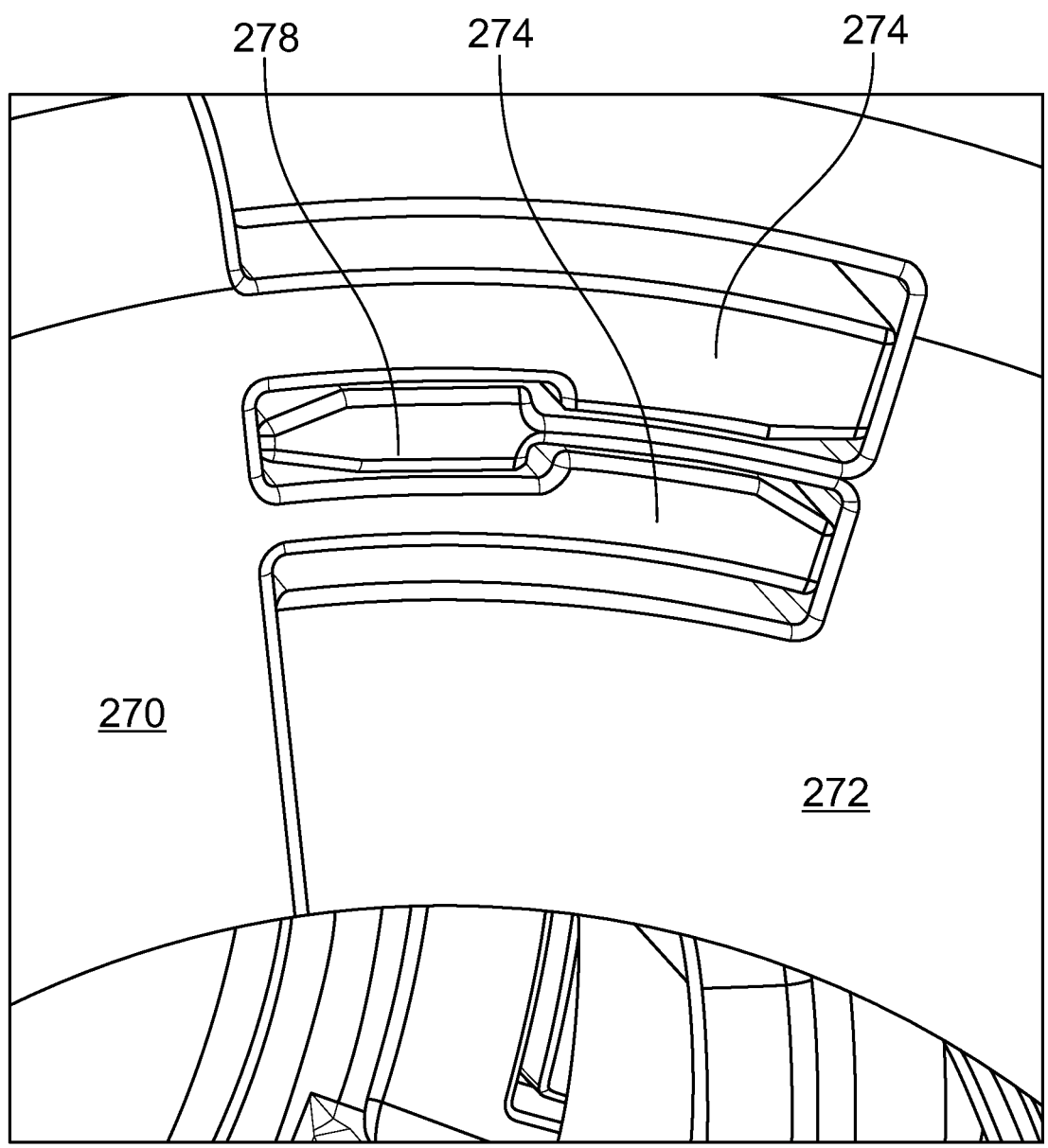
FIG. 13 is a close-up view of the end cap of FIG. 10 showing the complementary interconnection of the two end cap parts.
Figure 14:
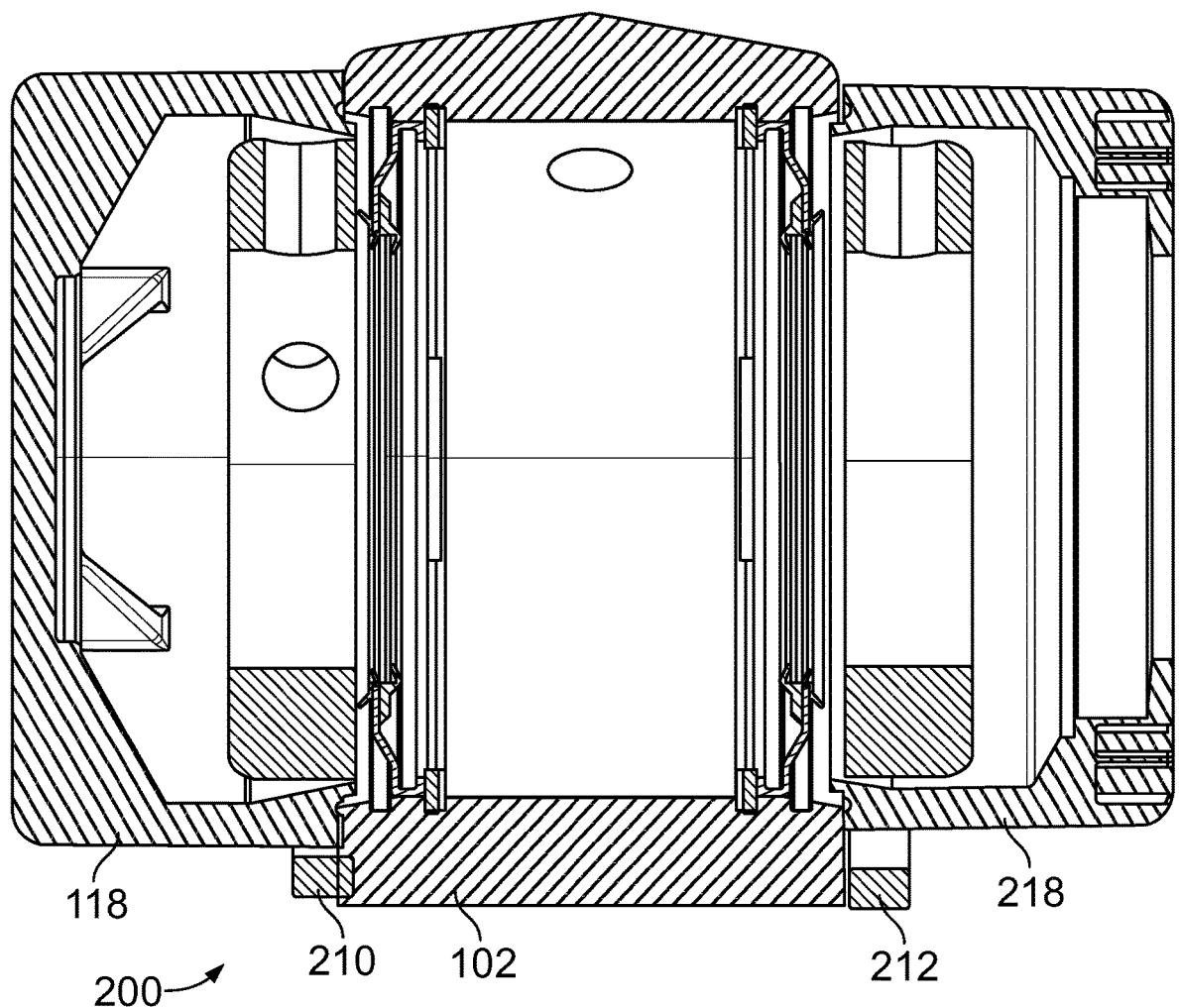
FIG. 14 is a cross-sectional view of the bearing cover assembly of FIG. 9 attached to the bearing housing.

Turning to FIGS. 7 and 8, each bracket 110, 112 has the same configuration, and therefore only one bracket will be discussed here. Bracket 110 has two main portions, a shaft portion 150 and a curved arm portion 152. The shaft portion 150 includes and internal bore 154 that is sized and shaped to receive a bolt 120b of fastener 120. The shaft portion 150 has a length that is at least the depth of the bearing housing 102.

Attached to the shaft portion 150 in a one-piece construction is the curved arm portion 152. The curved arm portion 152 has a notched terminal end 156 or forked end, which is sized and shaped to receive a bolt 120b of fastener 120. The curvature of the arm portion 152 permits the arm portion to extend around and outside the rolling element bearing 106 and such that attaching two brackets 110, 112 to each other and the cap 118 (e.g., see FIG. 2) positions respective shaft portions directly opposite each other. In an embodiment of the invention, the brackets 110, 112 are formed as a one-piece construction and would therefore be sized and shaped to fit to a specified bearing housing 102 or other mechanism.

Returning to FIG. 2 assembly of the bearing cover assembly 100 proceeds (not necessarily in this order) by positioning the cap 118 onto the first face 114 of the bearing housing 102 after positioning of the brackets 110, 112. A first bracket 110 is positioned with the bore 154 of the shaft portion 150 aligned with the bore 138 of the tab 134 on the left side and the curved arm portion 152 extending below and around the cap such that the notch 156 aligns with the bore 138 of the tab 134 on the right side thereof (referring to the device as illustrated in the drawing). The second bracket 112 is positioned with bore 154 of the shaft portion 150 aligned with the bore 138 of the tab 134 on the right side of the cap 118 and the curved arm portion 152 extending below and around the bearing housing and on the opposite of the bearing housing 102 opposite the cap 118 such that the notch 156 aligns with the bore of the tab 134 on the left side. Bolt 120b passes through the bore 138 of the right tab 134, through notch 156 of first bracket 110 and bore 154 of the shaft portion 150 of the second bracket 112 and is secured in position by nut 120a. Similarly, bolt 122b passes through bore 138 of the left tab 134, through the shaft portion 150 of the first bracket 110 and notch 156 of the second bracket 112 and is secured in position with nut 122a. Tightening nuts 122a and 120a causes the brackets 110, 112 to be drawn together towards the bearing housing 102 and draws the cap 118 into position on the bearing housing 102 as described above. An assembly 100 with a single cap 118 and two brackets 110, 112 is employed when only one side of the bearing housing 102 is to be protected and a shaft disposed in the housing bore 104 does not extend from the side 114 of the bearing housing on the side with the cap.

FIGS. 9-14 illustrates an embodiment configured to secure a protective cap on opposite sides of a bearing housing. The bearing cover assembly 200 shares many of its features with the preceding embodiment. In particular, the only significant difference is the additional cap 218 that forms part of the assembly 200 and the adaptation of the first and second brackets 210, 212 and the fasteners 220, 222 to the addition of the additional cap. It will be understood that like reference characters will be used for components and features that are shared with the above-described embodiment.

The bearing cover assembly 200 includes a cap 118 that is sized and shaped to be positioned on a first face 114 of the bearing housing 102 and a second cap 218 that is sized and shaped to be positioned on a second face 116 of the bearing housing. The first and second cap 118, 218 are held in position by first and second brackets 210, 212 in the same manner as the embodiment of FIGS. 1-8 with fasteners 220, 222.

As noted above, the fasteners 220, 222 have a length configured to fix both the first and second caps 118, 218 on the bearing housing with similar adaptations to the lengths of the shaft portions 250 of both of the first and second brackets 210, 212. In one embodiment, the length of the fasteners 220, 222 is sufficient to permit installation without removal of the fasteners. Thus, the fasteners or other parts of the assembly cannot become detached from the assembly during installation and potentially lost or dropped into nearly machinery.

In one embodiment, the second cap 218 of the bearing cover assembly 200 can have other configurations and features to facilitate access to the rolling element bearing and/or the shaft supported therein. For example, referring to FIGS. 10, 12, and 13, the end cap 218 can have a multi-part construction and can include a first semicircular part 270 and a second semicircular part 272. Each of the first and second semicircular parts 270, 272 includes a tab 234 that is sized, shaped, and positioned like that of the first cap 118. The first and second semicircular parts 270, 272 can be identical in shape, complementary to each other, and, when arranged in mirrored opposition, can be clamped together to produce the end cap 218. The first and second semicircular parts 270, 272 can each include structures that correspond to that of the first cap 118 to permit sealing engagement with the second face 116 of the bearing housing 102, which will be understood to include an analogous interior conical surface formed at the housing bore 104 like the surface of the first face 114.

To clamp the first and second semicircular parts 270, 272 together, each part can include a clamp 274 located on one interfacing surface 276 and a tongue 278 located on a second interfacing surface 280. The clamp 274 can be a bifurcated structure that is adapted to receive and lock down on the tongue 278 when the first and second interfacing surfaces 276, 280 are positioned against each other. The clamp 274 and tongue 278 therefore hold the end cap 218 together.

To enable access to the rolling element bearing and/or the shaft, the cap 218 can be configured with a central aperture 282 disposed there through. The central aperture 282 can be produced by two semi-apertures 284 disposed in the first and second semicircular parts 270, 272 and can be concentrically aligned with the axis line of the bearing housing 102. The central aperture 220 can accommodate instruments such as, for example, purge valves for re-lubricating the bearing, speed sensors for measuring the speed of the rotating shaft, and other functions. In another example, the rotating shaft may extend through the central aperture 282 to protrude from the end cap 218.

Assembly of the bearing cover assembly 200 of the present embodiment is similar to that of the preceding embodiment with the additional requirement that the first and second semicircular parts 270, 272 are assembled and installed on the second face 116 of the bearing housing 102 by interconnecting the second cap 218, the first cap 118, first and second brackets 210, 212, and fasteners 220, 222.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A bearing cover assembly comprising:
   a end cap comprising:
      a sidewall;
      a open end,
      a annular sleeve portion extending from the open end, the sleeve portion including a outer bevel formed about a circumference of the sleeve portion, and
      a pair of tabs formed on the sidewall; and
   a first bracket and a second bracket, each of the first and second brackets including a shaft portion and a curved portion;
   wherein the shaft portion of the first bracket is attached to a first tab of the pair of tabs with a first fastener and a free end of the curved portion of the first bracket is attached to a second fastener, and the shaft portion of the second bracket is attached to a second tab of the pair of tabs by the second fastener.

2. The bearing cover assembly of claim 1 wherein the sidewall is annular.

3. The bearing cover assembly of claim 1 wherein the first tab and the second tab are disposed a opposing sides of the sidewall.

4. The bearing cover assembly of claim 3 wherein the first tab and the second tab each include a bore.

5. The bearing cover assembly of claim 4 wherein the shaft portions of the first and second brackets each include a longitudinal bore.

6. The bearing cover assembly of claim 5 wherein each longitudinal bore is sized to receive one of the first or second fasteners therethrough.

7. The boring cover assembly of claim 6 wherein the free end of the curved portion of the first and second brackets each includes a notch.

8. The bearing cover assembly of claim 7 wherein the notch is sized and shaped to receive one of the first and second fasteners.

9. The bearing cover assembly of claim 8 wherein the first and second fasteners each include a threaded bolt and a nt.

10. The bearing cover assembly of claim 9 wherein the threaded bolt of the first fastener passes through the bore of the first tab, the notch of the first bracket, the bore of the shaft portion of the second bracket and is secured with the corresponding nut on a free end thereof, and the threaded bolt of the second fastener passes through the bore of the second tab, the bore of the shaft portion of the first bracket, the notch of the second bracket and is secured with the corresponding nut on a free end thereof.

11. The bearing cover assembly of claim 1 wherein the end cap is a first end cap and the bearing cover assembly further comprises a second end cap that is secured opposite the first end cap.

12. The bearing cover assembly of claim 11 wherein the second end cap is formed of a first semicircular part and a second semicircular part clamped together.

13. The bearing cover assembly of claim 12 wherein the second end cap defines a central aperture when the first semicircular part and the second semicircular part are clamped together.

14. A bearing housing and bearing cover assembly comprising:
   a bearing housing including a rolling element bearing installed in a housing bore, the housing bore defining an axis line, wherein an interior conical surface is formed in the bearing housing at the housing bore; and
   a bearing cover assembly attached to the bearing housing, the bearing cover assembly including an end cap, the end cap including a sidewall, an open end, an annular sleeve portion formed at the open end, the sleeve portion including an outer bevel formed about a circumference of the sleeve portion, a pair of tabs formed on the sidewall, and a bracket portion configured to secure the end cap to the bearing housing via the pair of tabs such that the outer bevel of the end cap engages the interior conical surface of the bearing housing to position the end cap on the bearing housing.

15. The bearing housing and bearing cover assembly of claim 14 wherein the bracket portion includes a first bracket and a second bracket.

16. The bearing housing and bearing cover assembly of claim 15 wherein the first and second brackets each include a shaft portion and a curved portion.

17. The bearing housing and bearing cover assembly of claim 16 wherein the shaft portion of the first bracket is attached to a first of the pair of tabs with a first fastener and a free end of the curved portion of the first bracket is attached to a second fastener, and the shaft portion of the second bracket is attached to a second of the pair of tabs by the second fastener.

18. The bearing housing and bearing cover assembly of claim 17 wherein each curved portion is sized and shaped to be positioned radially outside the rolling element bearing.

19. The bearing housing and bearing cover assembly of claim 14 wherein the end cap is a first end cap and the bearing cover assembly further comprises a second end cap that is secured opposite the first end cap.

20. The bearing housing and bearing cover assembly of claim 19 wherein the second end cap defines a central aperture.

* * * * *

UNITED STATES PATENT AND TRADEMARK OFFICE
CERTIFICATE OF CORRECTION

| | |
|---|---|
| PATENT NO. | : 11,555,520 B2 |
| APPLICATION NO. | : 17/326690 |
| DATED | : January 17, 2023 |
| INVENTOR(S) | : William G. Hewitt et al. |

It is certified that error appears in the above-identified patent and that said Letters Patent is hereby corrected as shown below:

In the Claims

Claim 1
Column 7, Line 3: Before "end cap", please delete "a" and insert --an--.
Column 7, Line 5: Before "open end", please delete "a" and insert --an--.
Column 7, Line 6: Before "annular sleeve", please delete "a" and insert --an--.
Column 7, Line 7: Before "outer bevel", please delete "a" and insert --an--.

Claim 3
Column 7, Line 22: Before "opposing sides", please delete "a" and insert --on--.

Claim 7
Column 7, Line 32: Before "cover assembly", please delete "boring" and insert --bearing--.

Signed and Sealed this
Fourteenth Day of March, 2023

Katherine Kelly Vidal
*Director of the United States Patent and Trademark Office*